Patented June 22, 1943

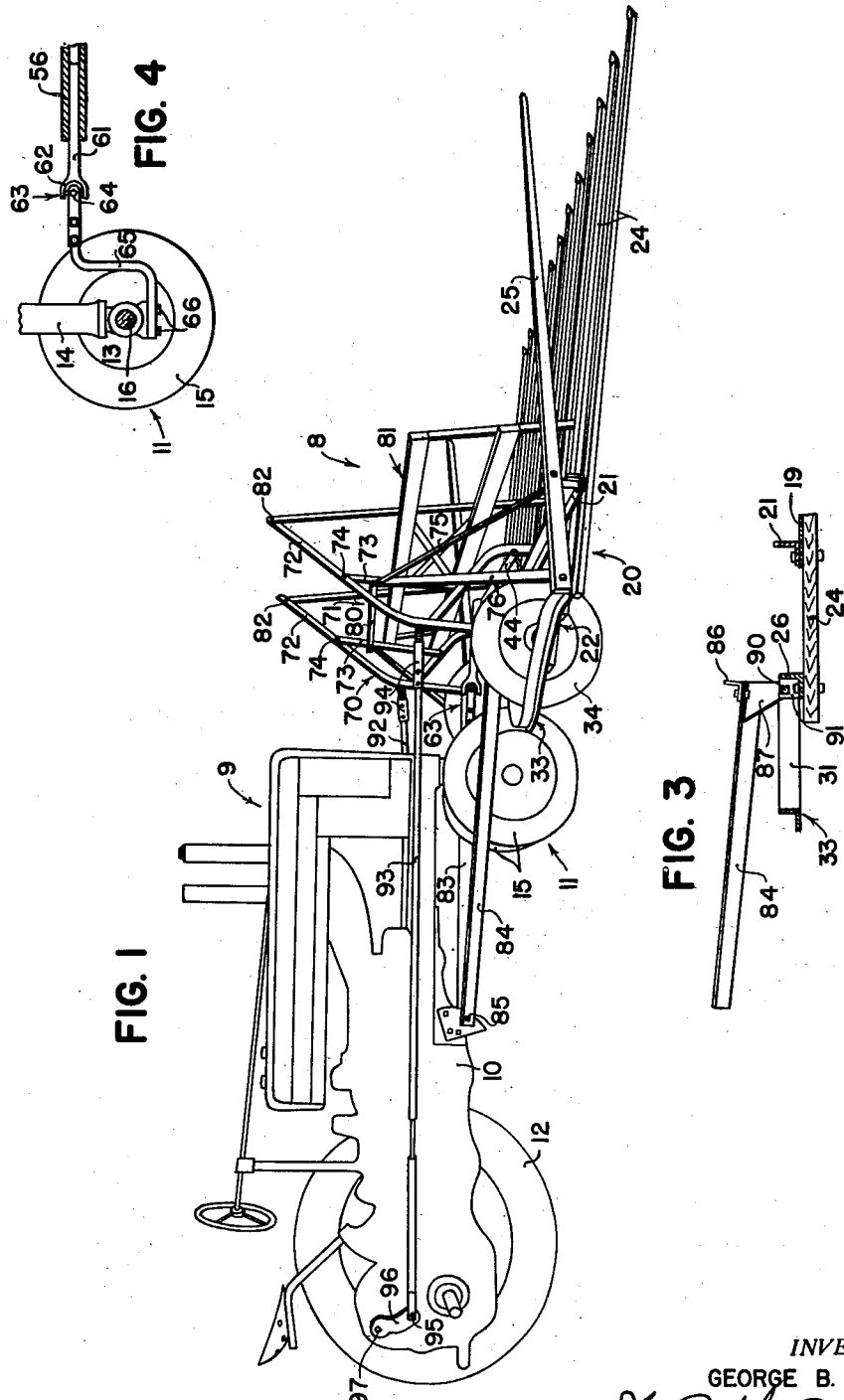

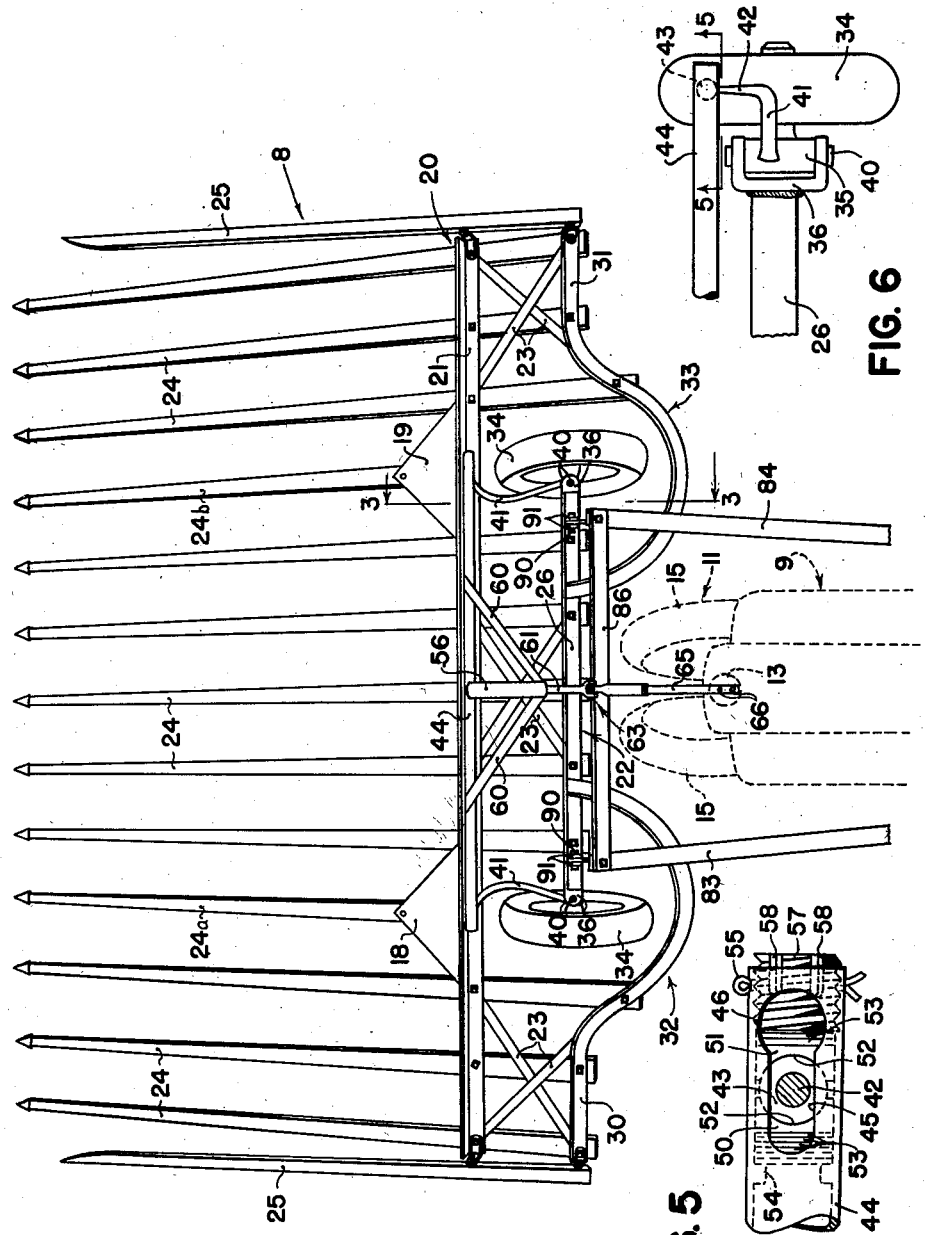

2,322,295

UNITED STATES PATENT OFFICE 2,322,295

SWEEP RAKE

George B. Hill, Ottumwa, Iowa, assignor to Dain Manufacturing Company of Iowa, Ottumwa, Iowa, a corporation of Iowa Application March 20, 1940, Serial No. 324,935

7 Claims. (Cl. 56—27)

The present invention relates to agricultural implements and has as its principal object the provision of a new and improved tractor mounted sweep rake having a rake head structure supported on dirigible wheels disposed intermediate the ends thereof and so arranged as to provide ample clearance for turning the wheels to either side. One of the features of my invention is that the rake head supporting wheels are disposed closely adjacent the front wheels of the tractor, resulting in greatly improved steering qualities for the implement.

Another object is to provide a wheel supported rake head structure that combines great strength with light weight and can be manufactured at low cost.

A further object of my invention is to provide an improved steering connection between the steering spindle of a tractor and the dirigible wheels of an implement associated with the tractor.

Still another object of my invention is to provide an improved adjustable ball and socket connection between the dirigible wheel axle member and the steering linkage of a tractor mounted sweep rake.

These and other objects and advantages of the present invention will become apparent after consideration of the following detailed description of the preferred embodiment thereof, reference being had to the accompanying drawings, in which Figure 1 is a perspective side view of a tractor mounted sweep rake constructed according to the principles of my invention, the near wheel of the tractor being removed to show the lifting connection;

Figure 2 is a perspective plan view of the front end of the rake, with a portion of the structure removed for a clearer showing of the details of the rake head and steering linkage;

Figure 3 is a sectional view taken substantially along the line 3—3 in Figure 2;

Figure 4 is a partially sectioned detail view of the tractor steering spindle and its connection with the steering linkage on the rake head, the near wheel being removed for a clearer showing of the construction;

Figure 5 is an enlarged sectional view through one of the steering arms, taken substantially along the line 5—5 in Figure 6 and showing the adjustable socket connection at one end of the tie rod; and Figure 6 is a front elevational view of one of the dirigible wheels for supporting the rake head.

Referring now to the drawings, the sweep rake 8 is adapted to be mounted on a tractor 9 having a generally longitudinally extending body 10 supported at its front end on a dirigible truck 11 and at its rear end on a pair of laterally spaced driving wheels 12, only one of which is shown in Figure 1. The dirigible truck 11 comprises a vertical steering spindle 13 journaled in a sleeve 14 and having a pair of laterally spaced wheels 15 journaled on axles 16 extending laterally and downwardly from the lower end of the spindle.

The sweep rake 8 has a rake head 20 comprising a pair of longitudinally spaced, generally transversely extending members 21 and 22 connected by crossed diagonal bracing members 23 to form a rigid truss construction. A plurality of laterally spaced rake teeth 24 are connected at their rear ends to the transverse members 21, 22 and extend forwardly therefrom. Two of the teeth 24a and 24b, are supported entirely on the front member 21 by reason of the fact that the rake head supporting wheels to be described hereinafter are disposed between the transverse members 21, 22 in the line of these two teeth. Additional support is provided for teeth 24a, 24b, therefore, by means of two laterally spaced triangular gusset plates 18 and 19 which are fixed to the front member 21 and to their respective teeth 24a, 24b, as best shown in Figure 2. Fixed to the outer ends of the rake head are forwardly and upwardly extending side bars 25 which serve to prevent hay carried on the teeth from falling off to either side.

The rear transverse member 22 is preferably made up of a straight center beam 26 and two outer beams 30 and 31, the latter beams being substantially in alignment at their outer ends with the center beam 26 and offset rearwardly, preferably curved, to provide substantially semi-circular wheel-receiving sections 32 and 33, and joined to the center beam 26 at points spaced inwardly from the outer ends thereof. The outer ends of the beam 26 terminate substantially at the centers of the semi-circular sections 32, 33, respectively, and mounted on said outer ends are laterally spaced supporting wheels 34. Each of the wheels 34 is journaled on an axle member 35 which is disposed between the vertically spaced arms of a U-shaped bracket member 36 fixed to the outer end of the beam 26 and is pivotally connected therewith by a king pin 40 for turning about a vertical axis. An arm 41 is fixed to each of the axle members 35 and extends forwardly therefrom around the front of its respective wheel, the front end of the arm being turned upwardly and tapered to form a shank 42 of reduced diameter having a ball 43 provided at its extremity.

The wheels 34 are connected with the vertical spindle 13 on the tractor to turn in unison with the tractor wheels 15 by means of steering linkage comprising a transversely disposed tie rod 44, preferably in the form of a tube, extending across the front of the rake head 29 from one of the steering arms 41 to the other. Each end of the tube 44 is provided with an adjustable socket connection for engaging the ball 43, (see Figure 5) and this connection consists of a keyhole slot 45 formed in the bottom of the tube 44 with the restricted portion thereof extending longitudinally of the tube. The enlarged portion 46 of the key hole slot is adapted to pass the ball 43 so that the latter can be inserted into the interior of the tube 44, while the restricted portion of the slot allows the reduced shank 42 to slide lengthwise therein and also provides for a limited amount of rocking motion of the tube 44 on the ball 43. A pair of companionate concave socket members 50 and 51 are slidably disposed within the tube 44 and have their adjacent faces 52 formed to provide a substantially hemispherical socket within which the ball 43 is engaged. A plurality of wafer-like spacers or shims 53 are adapted to be selectively positioned within the tube behind either of the members 50, 51 and provide an axial adjustment of the socket members within the tube for purposes of aligning the wheels 34. An annular shoulder 54 formed on the inner wall of the tube 44 supports the spacers from one direction, and a threaded plug 57 is screwed into the end of the tube to hold the spacers from the other direction. The end of the plug 57 is provided with notches 58 to receive a split cotter pin 55 which is inserted through aligned holes in the tube, thereby locking the plug securely in place in the pipe.

Fixed to the midpoint of the tube 44 and extending perpendicularly rearwardly therefrom is a tube 56 which is braced laterally with respect to the tube 44 by forwardly diverging bracing members 60, welded or otherwise fixed thereto. Slidably disposed within the tube 56 is a shaft 61, the rear end of which is bifurcated to form one of the yokes 62 of a universal joint 63. The other yoke 64 of the universal joint is fixed to the front end of an arm 65 which is bolted at 66 to the bottom of the vertical steering spindle 13 and extends forwardly and upwardly therefrom. Thus, when the steering spindle 13 is turned in either direction, the arm 65 turns with it and, by virtue of the universal joint and telescopic shaft connection with the tube 44, causes the latter to move axially, thereby turning the wheels 34 in unison with the tractor wheels 15.

Spaced on either side of the fore and aft center line of the rake are a pair of generally vertically extending frame structures 70 and 71, mounted on the transverse members 21 and 22. Each of the vertical frame structures comprises a pair of upwardly extending members 72 and 73, fixed at their lower ends to the transverse beams 26 and 21, respectively, and joined together at 74. Each of the vertically extending frame structures 70, 71 is braced by a pair of struts 75 and 76 which are fixed to the outer ends of the transverse members 21 and 31, respectively, and converge upwardly and inwardly to connect with vertical frame members 73. A transversely extending tie beam 80 extends between the two vertical structures 70 and 71 and is connected therewith at the points of connection with bracing members 75, 76.

A push-off device 81 is swung from pivot bolts 82 inserted through suitable apertures in the upper ends of the members 72.

The sweep rake 8 is adapted to be mounted on the tractor 9 with the tractor dirigible wheels 15 disposed between the wheel receiving sections 32, 33 of the rake head and in overlapping relation with respect to the rake supporting wheels 34, as shown in Figure 2. To this end, a pair of laterally spaced fore and aft extending push bars 83, 84 are disposed along opposite sides of the tractor body and are pivotally connected therewith at their rear ends for vertical swinging by pivot bolts 85. The push bars 83, 84 diverge forwardly and are connected together at their front ends by a cross beam 86. Downwardly extending plates 87 are fixed to the front ends of the push bars 83, 84 and are pivotally connected at 90 with brackets 91 fixed to the cross beam 26, to allow the rake to be tilted vertically relative to the bars about the transverse axis of pivot bolts 90—90.

The rake head 20 is tilted between raking and transport positions about the axis of the wheels 34 through the agency of a pair of laterally spaced, longitudinally extending rods 92, 93 disposed on opposite sides of the tractor and connected at their front ends with the vertical frame members 72 by yielding spring connections 94. The rear ends of the rods 92, 93 are pivoted at 95 on arms 96 mounted on the outer ends of the transversely extending lift shaft 97, which may be rocked by any suitable means. Rocking the shaft 97 in a clockwise direction pulls the rods 92, 93 to swing the rake head up to raised position.

It is believed that the advantages of my invention will be apparent from the foregoing description of the preferred embodiment thereof, and what I claim and desire to secure by Letters Patent is:

1. A tractor-propelled sweep rake comprising longitudinally spaced front and rear members disposed transverse to the line of forward travel, said rear member comprising a center beam and two outer beams connected therewith and extending laterally in opposite directions, a pair of dirigible supporting wheels connected with the outer ends of said center beam for turning about vertical pivots, each of said outer beams being offset rearwardly with respect to the center beams to provide clearance for its respective wheel.

2. A tractor-propelled sweep rake comprising longitudinally spaced front and rear members disposed transverse to the line of forward travel, said rear member comprising a center beam and two outer beams connected therewith and extending laterally in opposite directions, a pair of dirigible wheels pivoted on the outer ends of said center beam for turning on vertical axes, each of said outer beams being curved rearwardly to provide clearance for its respective wheel, the outer end portions of said outer beams being disposed substantially in alignment with said center beam.

3. A tractor-propelled sweep rake comprising a rake head having a pair of longitudinally spaced transverse tooth carrying members, one of said members comprising a center beam and two outer beams joined together to form a unitary member, said outer beams being connected with said center beam at points spaced inwardly from the outer ends thereof and having curved offset portions substantially arcuate about the outer ends of the center beam, a pair of laterally spaced supporting wheels disposed between said transverse members, and means pivotally supporting said wheels on the outer ends of said center beam for turning on vertical axes.

4. A sweep rake comprising a rake head including a front transverse tooth supporting frame member, a transverse axle member spaced rearwardly of said frame member and terminating inwardly of the ends of the latter, a pair of ground wheels mounted at opposite ends of said axle member, and a pair of rear frame members connected at their inner ends to said axle member adjacent the respective wheels and extending rearwardly and outwardly of said wheels, and bracing members connecting said front and rear frame members outside of said wheels.

5. A tractor operated sweep rake comprising a rake head including a front transverse frame member, a transverse axle member spaced rearwardly of said front member and terminating inwardly of the ends of the latter, a pair of dirigible ground wheels mounted at opposite ends of said axle member, respectively, by means providing for movement about general vertical axes, a pair of rear frame members connected at their inner ends to said axle member in laterally spaced arrangement and curving rearwardly about said wheels, the outer ends of said rear frame members extending laterally in substantial alignment with said axle member, and a plurality of longitudinally extending rake teeth fastened to said front transverse frame member and to said axle and rear frame members.

6. A tractor operated sweep rake comprising a rake head, draft means therefor, a pair of laterally spaced supporting wheels for said rake head, axle means for each of said wheels, said axle means being pivotally supported on said rake head on substantially vertical axes, a pair of steering arms fixed to said axle means, respectively, a steering bar adapted to be rigidly mounted on the steering post of a tractor to extend forwardly therefrom, a rigid steering tie member, and three flexible joint means for connecting said tie member with said steering arms on said laterally spaced wheels and with said steering bar, respectively, said tie member being supported solely on said three flexible joint means.

7. A tractor operated sweep rake comprising a rake head, vertically swingable draft members for connecting the latter with a tractor, a pair of laterally spaced supporting wheels for said rake head, axle means for each of said wheels, said axle means being pivotally supported on said rake head on substantially vertical axes, a pair of steering arms fixed to said axle means, respectively, a steering bar adapted to be rigidly mounted on the steering post of a tractor to extend forwardly therefrom, a rigid T-shaped steering tie member comprising a transverse tie rod extending between said steering arms, universal joints connecting said arms with opposite ends of said tie rod and supporting the latter, and a longitudinally extending member rigidly fixed to said tie rod intermediate the ends of the latter, a second longitudinally disposed member telescopically related to the first mentioned longitudinally extending member, and a universal joint connecting said second longitudinal member with said steering bar and serving as a third support for said T-shaped tie member, whereby said steering tie member is supported solely upon said steering arms and said steering bar and is shifted laterally by the latter to steer the rake wheels with the tractor.

GEORGE B. HILL.